United States Patent
Yang et al.

(10) Patent No.: US 12,493,745 B2
(45) Date of Patent: Dec. 9, 2025

(54) EXTRACTION OF KEYPHRASES FROM GENEALOGICAL DESCRIPTIONS

(71) Applicant: Ancestry.com Operations Inc., Lehi, UT (US)

(72) Inventors: Yingrui Yang, San Mateo, CA (US); Nasim Sonboli, Boulder, CO (US); Yen-Yun Yu, Murry, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 506 days.

(21) Appl. No.: 17/947,087

(22) Filed: Sep. 17, 2022

(65) Prior Publication Data
US 2023/0091076 A1    Mar. 23, 2023

Related U.S. Application Data

(60) Provisional application No. 63/246,745, filed on Sep. 21, 2021.

(51) Int. Cl.
*G06F 40/295* (2020.01)
*G06N 5/02* (2023.01)
*G06N 20/20* (2019.01)

(52) U.S. Cl.
CPC .............. *G06F 40/295* (2020.01); *G06N 5/02* (2013.01); *G06N 20/20* (2019.01)

(58) Field of Classification Search
CPC ........ G06F 40/295; G06N 5/02; G06N 20/20; G06N 5/022; G06N 20/00
See application file for complete search history.

(56) References Cited

U.S. PATENT DOCUMENTS

| | | | |
|---|---|---|---|
| 2016/0048546 A1* | 2/2016 | Weisman | G06F 16/23 707/748 |
| 2016/0110502 A1* | 4/2016 | Bronson | G16H 50/70 705/3 |
| 2019/0155944 A1* | 5/2019 | Mahata | G06F 16/93 |

* cited by examiner

*Primary Examiner* — Athar N Pasha
(74) *Attorney, Agent, or Firm* — Keller Preece PLLC

(57) ABSTRACT

Hybrid machine-learning systems and methods can be used to perform automatic keyphrase extraction from input text, such as historical records. For example, a computer-implemented method for extracting keyphrases from input text can include receiving input text having a plurality of words and identifying a set of candidate phrases from the plurality of words and a score for each of the candidate phrases using one or more unsupervised machine-learning models. The method can also include identifying named entities from the set of candidate phrases using one or more supervised machine-learning models and determining an updated set of scores for at least some of the candidate phrases within the set based on the named entities identified using the supervised machine-learning model. The method can also include identifying a keyphrase from the set of candidate phrases based on the updated set of scores.

20 Claims, 15 Drawing Sheets

Title 630 — U.S., World War II Draft Registration Cards, 1942

Facets 632 —
```
1940 Era Collections; Draft, Enlistment and Service; Early Settlers of Ohio River Valley; Global New Year's Free
Access; Global Records; GoldenRecords; Lower Midwest & Virginia Settlers; MerlinCollections; Military Records; MARA R
eports; NE Italy Top; NE Sweden Top; NE US; New York Settlers; Northeastern States Settlers; Records from The Nation
al Archives; Remembrance Day Collections; Select Military Records; Southern States Settlers; U.S. Military Records
```

Short Description 634 — U.S., World War II Draft Registration Cards, 1942
This database is an indexed collection of the draft cards from the Fourth Registration, the only registration currently available to the public (the other registrations are not available due to ...)

About U.S., World War II Draft Registration Cards, 1942

Words 612 ⋯

The U.S. officially entered World War II on 8 December 1941 following an attack on Pearl Harbor, Hawaii. Just about a year before that, in October 1940, President Roosevelt had signed into law the first peacetime selective service draft in U.S. history, due to rising world conflicts. After the U.S. entered WWII a new selective service act required that all men between ages 18 and 65 register for the draft. Between November 1940 and October 1946, over 10 million American men were registered. This database is an indexed collection of the draft cards from the Fourth Registration. The Fourth Registration, often referred to as the "old man's registration", was conducted on 27 April 1942 and registered men who born on or between 26 April 1877 and 16 February 1897 - men who were between 45 and 64 years old - and who were not already in the military. Information available on the draft cards includes:

- Name of registrant
- Age
- Birth date
- Birthplace
- Residence
- Employer information
- Name and address of person who would always know the registrant's whereabouts
- Physical description of registrant (race, height, weight, eye and hair colors, complexion)

Additional information such as mailing address (if different from residence address), serial number, order number, and board registration information may also be available.

For individuals who lived near a state border, sometimes their Draft Board Office was located in a neighboring state. Therefore, you may find some people who resided in one state, but registered in another.

Long Description 636

Locating Originals:

The original draft cards are held by each state's National Archives and Records Administration (NARA) Regional Branch. All of these cards are also available on microfilm from the Family History Library (FHL) and/or NARA.

How are the Cards Organized?

The draft cards are arranged by state and are then in alphabetical order by surname, followed by the local draft board number. There may be instances where the cards are filed out of order. For example, there are some surnames beginning with M in the Q-S surname range. These are correct, as the cards were misordered prior to filming.

Note regarding the images for the states of DE, MD, PA, and WV: These four states were microfilmed at the National Archives in such a way that the back of one person's draft card appears in this same image as the front of the next individual's card. Thus, when viewing the scanned image of each person's original draft card you will see the correct front side of each person's draft card, but the back side of the previous person's card. The draft cards for states other than Delaware, Maryland, Pennsylvania, and West Virginia were microfilmed in a different manner and thus images of the original draft cards from those other states display correctly in the database.

Updates:

29 Mar 2019: Added images and records that were missing from the state of Montana.
7 Nov 2019: Changes were made to improve the performance of this collection. No new records were added. 21 May 2020: Added 868 records that were missing from the state of Massachusetts.

Input Text 610 (Collection)

FIG. 6A

Processed Input Text 610A

| Portion of Long Description | Similarity to Short Description | Select? |
|---|---|---|
| The U.S. officially entered World War II on 8 December 1941 following an attack on Pearl Harbor, Hawaii. Just about a year before that, in October 1940, President Roosevelt had signed into law the first peacetime selective service draft in U.S. history, due to rising world conflicts. After the U.S. entered WWII a new selective service act required that all men between ages 18 and 65 register for the draft. Between November 1940 and October 1946, over 10 million American men were registered. This database is an indexed collection of the draft cards from the Fourth Registration. The Fourth Registration, often referred to as the "old man's registration", was conducted on 27 April 1942 and registered men who born on or between 28 April 1877 and 16 February 1897 - men who were between 45 and 64 years old - and who were not already in the military. Information available on the draft cards includes:<br>• Name of registrant<br>• Age<br>• Birth date<br>• Birthplace<br>• Residence<br>• Employer information<br>• Name and address of person who would always know the registrant's whereabouts<br>• Physical description of registrant (race, height, weight, eye and hair colors, complexion) | 0.64 | Yes |
| Additional information such as mailing address (if different from residence address), serial number, order number, and board registration information may also be available. | 0.12 | No |
| For individuals who lived near a state border, sometimes their Draft Board Office was located in a neighboring state. Therefore, you may find some people who resided in one state, but registered in another. | -0.03 | No |
| Locating Originals:<br>The original draft cards are held by each state's National Archives and Records Administration (NARA) Regional Branch. All of these cards are also available on microfilm from the Family History Library (FHL) and/or NARA. | 0.34 | No |
| How are the Cards Organized?<br>The draft cards are arranged by state and are then in alphabetical order by surname, followed by the local draft board number. There may be instances where the cards are filed out of order. For example, there are some surnames beginning with M in the Q-S surname range. These are correct, as the cards were misordered prior to filming. | 0.26 | No |
| Note regarding the images for the states of DE, MD, PA, and WV: These four states were microfilmed at the National Archives in such a way that the back of one person's draft card appears in the same image as the front of the next individual's card. Thus, when viewing the scanned image of each person's original draft card you will see the correct front side of each person's draft card, but the back side of the previous person's card. The draft cards for states other than Delaware, Maryland, Pennsylvania, and West Virginia were microfilmed in a different manner and thus images of the original draft cards from those other states display correctly in the database. | 0.02 | No |
| Updates:<br>29 Mar 2019: Added images and records that were missing from the state of Montana. 7 Nov 2019: Changes were made to improve the performance of this collection. No new records were added. 21 May 2020: Added 868 records that were missing from the state of Massachusetts. | 0.15 | No |

FIG. 6B

| Phrase | Score | Model |
|---|---|---|
| pearl harbor | 0.5 | TF-IDF |
| fourth registration | 0.82 | TextRank, FirstPhrase, StupidKE |
| registration | 0.5 | YAKE |
| attack on pearl harbor | 0.5 | StupidKE |
| President Roosevelt | 0.4306 | TF-IDF |
| october 1940 president | 0.4306 | TextRank |
| attack on pearl harbor, hawaii | 0.4306 | YAKE |
| draft | 0.4306 | FirstPhrase |
| U.S. | 0.375 | TF-IDF |
| first peacetime | 0.375 | TextRank |
| world war II | 0.487 | YAKE, FirstPhrase |
| registrant | 0.375 | StupidKE |

FIG. 6E

| Phrase | Score | NER Model |
|---|---|---|
| pearl harbor | 0.62 | SpaCy, ELMo |
| fourth registration | 0.82 | |
| registration | 0.5 | |
| attack on pearl harbor | 0.5 | |
| President Roosevelt | 0.49 | SpaCy |
| october 1940 president | 0.4306 | |
| attack on pearl harbor, hawaii | 0.4306 | |
| draft | 0.49 | SpaCy |
| U.S. | 0.495 | SpaCy, ELMo |
| first peacetime | 0.375 | |
| world war II | 0.607 | SpaCy, ELMo |
| registrant | 0.375 | |

Supervised Models 624

FIG. 6F

| Phrase | Score | Wikipedia |
|---|---|---|
| pearl harbor | 0.69 | Yes |
| fourth registration | 0.82 | |
| registration | 0.5 | |
| attack on pearl harbor | 0.57 | Yes |
| President Roosevelt | 0.56 | Yes |
| october 1940 president | 0.4306 | |
| attack on pearl harbor, hawaii | 0.51 | Yes |
| draft | 0.49 | Yes |
| U.S. | 0.57 | Yes |
| first peacetime | 0.375 | |
| world war II | 0.68 | Yes |
| registrant | 0.375 | |

FIG. 6G

| Phrase | Score |
|---|---|
| pearl harbor | 0.35 |
| fourth registration | 0.86 |
| registration | 0.25 |
| attack on pearl harbor | 0.28 |
| President Roosevelt | 0.56 |
| october 1940 president | 0.4306 |
| attack on pearl harbor, hawaii | 0.93 |
| draft | 0.49 |
| U.S. | 0.57 |
| first peacetime | 0.375 |
| world war II | 0.68 |
| registrant | 0.375 |

FIG. 6H

| Phrase | Score |
|---|---|
| attack on pearl harbor, hawaii | 0.93 |
| fourth registration | 0.86 |
| world war II | 0.68 |
| U.S. | 0.57 |
| President Roosevelt | 0.56 |
| draft | 0.49 |
| october 1940 president | 0.4306 |
| first peacetime | 0.375 |
| registrant | 0.375 |
| pearl harbor | 0.35 |
| attack on pearl harbor | 0.28 |
| registration | 0.25 |

Keyphrases 620

FIG. 6I

EXTRACTION OF KEYPHRASES FROM GENEALOGICAL DESCRIPTIONS

CROSS-REFERENCE TO RELATED APPLICATIONS

The present application claims priority to Provisional Patent Application No. 63/246,745, filed Sep. 21, 2021, entitled "Extraction of Keyphrases from Genealogical Descriptions," which is hereby incorporated by reference in its entirety.

FIELD OF THE INVENTION

The disclosure relates generally to systems, methods, and/or computer-program products for extracting or determining keyphrases or other components from a description, such as a description of a genealogical record.

BACKGROUND OF THE INVENTION

Keyphrases may be understood as the set of terms or words in a text that provide a brief summary of the context and/or content of the text. For example, the keyphrases may relate to the main topics discussed in a given text. The keyphrases may directly appear in a text, and may therefore be identified based on an analysis of the text. The task of identifying keyphrases within a text may be referred to as "keyphrase extraction." Keyphrases can be valuable for searching, indexing, summarizing, or navigating content, but manually identifying keyphrases for a corpus of text is highly time-consuming, subjective, and costly. Since few authors provide keyphrases with their text (due in part to the laborious task of doing so), automatic keyphrase extraction using, for example, machine learning techniques have garnered significant attention.

Keyphrases have been used for document summarization, topic-based document searches, document clustering, among other applications. For example, document keyphrases have allowed for fast searching for a given document from a large collection of documents. However, current techniques for keyphrase extraction lack the efficiency and accuracy needed for many applications, such as the extraction of keyphrases from genealogical descriptions. This can be important in genealogical research, as tens of thousands of genealogical record collections may be stored in a database, such that manually tagging keyphrases for each collection is impractical. Moreover, such collections are often acquired and added to the database at such a rate that it is onerous to manually extract keyphrases. Because keyphrases are used in, for example, search engine retrieval, accurate and consistent determination of keyphrases is paramount. Manual extraction, by contrast, is inherently subjective and prone to errors and biases; that is, there is no objectively correct standard to evaluate a method for extracting keyphrases. Accurate keyphrase extraction is increasingly important for such research as genealogy researchers, including casual researchers, need to quickly assess the likely success of searching particular collections.

Unfortunately, existing approaches to keyphrase extraction are not built or trained with genealogy and other contexts in mind, such that existing approaches are ill-suited to the particular needs of genealogical and other collections. Some problems include a lack of long descriptions for collections (currently only about one-third of collections have long descriptions), collection description lengths, structural inconsistencies, changes in topic, a lack of correlations between topics, the lack of an objectively correct set of keyphrases or a way to objectively evaluate keyphrases, and etc. As such, new systems, methods, and other techniques for keyphrase extraction are needed.

SUMMARY OF THE INVENTION

A summary of the various embodiments of the invention is provided below as a list of examples. As used below, any reference to a series of examples is to be understood as a reference to each of those examples disjunctively (e.g., "Examples 1-4" is to be understood as "Examples 1, 2, 3, or 4").

Example 1 is a computer-implemented method for extracting a set of keyphrases from an input text, the computer-implemented method comprising: receiving the input text having a plurality of words; identifying, using at least one unsupervised machine-learning model, a set of candidate phrases from the plurality of words, wherein each of the set of candidate phrases includes one or more words from the plurality of words; and selecting, using at least one supervised machine-learning model, the one or more keyphrases from the set of candidate phrases, the at least one supervised machine-learning model having been previously trained using a set of training examples.

Example 2 is the computer-implemented method of example(s) 1, wherein identifying the set of candidate phrases includes: identifying, using a first unsupervised machine-learning model of the at least one unsupervised machine-learning model, a first set of candidate phrases from the plurality of words; identifying, using a second unsupervised machine-learning model of the at least one unsupervised machine-learning model, a second set of candidate phrases from the plurality of words; and combining the first set of candidate phrases and the second set of candidate phrases to form the set of candidate phrases.

Example 3 is the computer-implemented method of example(s) 1-2, wherein selecting the one or more keyphrases from the set of candidate phrases includes: determining a first set of scores for the set of candidate phrases; calculating a first set of score adjustments by providing the set of candidate phrases to the at least one supervised machine-learning model; and determining a second set of scores for the set of candidate phrases by modifying the first set of scores using the first set of score adjustments.

Example 4 is the computer-implemented method of example(s) 3, wherein selecting the one or more keyphrases from the set of candidate phrases further includes: determining a ranking for the set of candidate phrases based on the second set of scores; and selecting the one or more keyphrases from the set of candidate phrases based on the ranking.

Example 5 is the computer-implemented method of example(s) 1-4, wherein the input text includes at least one of a title, a facet, a short description, or a long description.

Example 6 is the computer-implemented method of example(s) 1-5, further comprising, prior to identifying the set of candidate phrases: preprocessing the input text by removing or modifying at least one of the plurality of words.

Example 7 is the computer-implemented method of example(s) 1-6, further comprising, prior to selecting the one or more keyphrases: training the at least one supervised machine-learning model using the set of training examples.

Example 8 is the computer-implemented method of example(s) 1-7, wherein at least one supervised machine-learning model includes a model for performing named entity recognition.

Example 9 is a non-transitory computer-readable medium comprising instructions that, when executed by one or more processors, cause the one or more processors to perform operations comprising: receiving an input text having a plurality of words; identifying, using at least one unsupervised machine-learning model, a set of candidate phrases from the plurality of words, wherein each of the set of candidate phrases includes one or more words from the plurality of words; and selecting, using at least one supervised machine-learning model, one or more keyphrases from the set of candidate phrases, the at least one supervised machine-learning model having been previously trained using a set of training examples.

Example 10 is the non-transitory computer-readable medium of example(s) 9, wherein identifying the set of candidate phrases includes: identifying, using a first unsupervised machine-learning model of the at least one unsupervised machine-learning model, a first set of candidate phrases from the plurality of words; identifying, using a second unsupervised machine-learning model of the at least one unsupervised machine-learning model, a second set of candidate phrases from the plurality of words; and combining the first set of candidate phrases and the second set of candidate phrases to form the set of candidate phrases.

Example 11 is the non-transitory computer-readable medium of example(s) 9, wherein selecting the one or more keyphrases from the set of candidate phrases includes: determining a first set of scores for the set of candidate phrases; calculating a first set of score adjustments by providing the set of candidate phrases to the at least one supervised machine-learning model; and determining a second set of scores for the set of candidate phrases by modifying the first set of scores using the first set of score adjustments.

Example 12 is the non-transitory computer-readable medium of example(s) 11, wherein selecting the one or more keyphrases from the set of candidate phrases further includes: determining a ranking for the set of candidate phrases based on the second set of scores; and selecting the one or more keyphrases from the set of candidate phrases based on the ranking.

Example 13 is the non-transitory computer-readable medium of example(s) 9, wherein the input text includes at least one of a title, a facet, a short description, or a long description.

Example 14 is the non-transitory computer-readable medium of example(s) 9, wherein the operations further comprise, prior to identifying the set of candidate phrases: preprocessing the input text by removing or modifying at least one of the plurality of words.

Example 15 is the non-transitory computer-readable medium of example(s) 9, wherein the operations further comprise, prior to selecting the one or more keyphrases: training the at least one supervised machine-learning model using the set of training examples.

Example 16 is the non-transitory computer-readable medium of example(s) 9, wherein at least one supervised machine-learning model includes a model for performing named entity recognition.

Example 17 is a system comprising, one or more processors; and a computer-readable medium comprising instructions that, when executed by the one or more processors, cause the one or more processors to perform operations comprising: receiving an input text having a plurality of words; identifying, using at least one unsupervised machine-learning model, a set of candidate phrases from the plurality of words, wherein each of the set of candidate phrases includes one or more words from the plurality of words; and selecting, using at least one supervised machine-learning model, one or more keyphrases from the set of candidate phrases, the at least one supervised machine-learning model having been previously trained using a set of training examples.

Example 18 is the system of example(s) 17, wherein identifying the set of candidate phrases includes: identifying, using a first unsupervised machine-learning model of the at least one unsupervised machine-learning model, a first set of candidate phrases from the plurality of words; identifying, using a second unsupervised machine-learning model of the at least one unsupervised machine-learning model, a second set of candidate phrases from the plurality of words; and combining the first set of candidate phrases and the second set of candidate phrases to form the set of candidate phrases.

Example 19 is the system of example(s) 17, wherein the operations further comprise, prior to identifying the set of candidate phrases: preprocessing the input text by removing or modifying at least one of the plurality of words.

Example 20 is the system of example(s) 17, wherein the operations further comprise, prior to selecting the one or more keyphrases: training the at least one supervised machine-learning model using the set of training examples.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

FIGS. 6A-6I illustrate an example of an extraction of one or more keyphrases from an input text using a keyphrase extraction system.

DETAILED DESCRIPTION OF THE INVENTION

Figure 1:
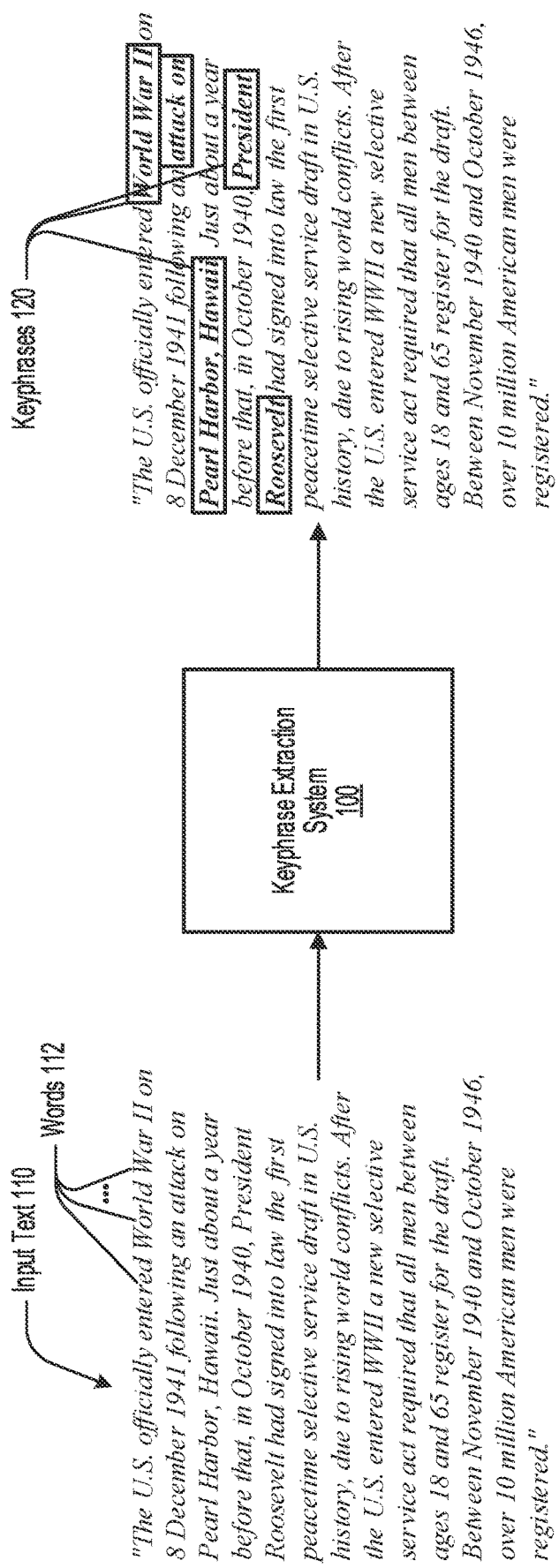
FIG. 1 illustrates an example functionality of a keyphrase extraction system.

One goal of keyphrase or terminology extraction is to get structured information from unstructured data. In general, keyphrase extraction attempts to extract keyphrases from a text such that (1) the keyphrases contain a concise description of their document and/or (2) the keyphrases are relevant to one or more of the text's major topics so that the keyphrases provide a coverage of each major topic or one or more major topics. In some instances, a keyphrase extraction task may be difficult to evaluate as there is no objectively correct set of keyphrases even among human-labeled samples. Other difficulties associated with keyphrase extraction include document length, structural inconsistency, changes in topic, and a lack of correlation between topics.

In some instances, a keyphrase extraction task consists of two main steps: (1) candidate term identification and (2) keyphrase selection. In the first step, candidate term identification is performed by identifying terms (e.g., words and/or phrases) that convey the topical content of a text or document. Several methods have been proposed to accomplish candidate term identification, such as brute force approaches, n-grams extraction, extracting POS patterns, using knowledge bases such as Wikipedia or WordNet, among others.

For the second step, keyphrase selection may be performed by scoring or ranking the candidate terms that were identified in the first step, followed by selecting the "best" candidates. The two main approaches that have been proposed to accomplish keyphrases selection include: (1) frequency statistics such as calculating the term frequency-inverse document frequency (TF-IDF) or the Okapi BM25 for terms and choosing the terms with the highest weights and (2) machine learning approaches which can be supervised methods, unsupervised methods, or hybrid methods.

Unsupervised methods attempt to extract the underlying structure of the data without the assistance of previously labeled examples. Some unsupervised approaches that have been proposed include: (1) graph-based ranking methods, (2) topic-based clustering, (3) simultaneous learning, and (4) language modeling. For graph-based ranking methods, the importance of a candidate is determined by its "relatedness" to other candidates. Relatedness can be interpreted as co-occurrence or semantic relations (semantic-relatedness). A document may be represented by a network where the nodes are keyphrases. A candidate phrase is important if it is connected to important keyphrases or a large number of keyphrases. Then nodes are ranked based on their importance using a graph-based ranking method. Some examples of these algorithms include TextRank, DivRank, SingleRank, ExpandRank, CollabRank, among others.

For topic-based clustering, the candidates are grouped into topics such that each topic is composed of several keyphrases. For simultaneous learning, text summarization and keyphrase extraction are performed simultaneously based on the key observations that important words appear in important sentences and a sentence is important if it contains important words. For language modeling, candidates may be scored based on their informativeness (i.e., the extent to which they capture the idea of the document) and "keyphraseness" (the extent to which a word sequence can be treated as a phrase).

Supervised methods have also been proposed. Some of these methods reformulate the keyphrase extraction task into a simple binary classification method that classifies the candidate phrases into "keyphrases" or "not keyphrases". Some of these methods may also turn the keyphrase extraction task into a ranking problem that ranks candidates pairwise according to the degree of "keyness" and, in some instances, create a competition between keyphrases. The top N keyphrases may be chosen as the document's keyphrases. In some instances, these ranking supervised methods outperform the binary classification methods.

Supervised methods may also include feature design methods. In some instances, such methods can use statistical features like TF-IDF, distance of a phrase (the number of words preceding to the first occurrence of the phrase normalized by the number of words in a document), phrase length (number of constituent words), phrase position (normalized position within a document of first and/or last occurrence therein), spread (the number of words between the first and last occurrence of the phrase), and "supervised keyphraseness" (number of times a keyphrase appears as such in the training data).

Embodiments of the present disclosure relate to a hybrid machine-learning technique for performing automatic keyphrase extraction. In some instances, embodiments of the present disclosure include preprocessing of text data, followed by the use of unsupervised automatic keyphrase detection methods to retrieve as many candidate phrases as possible. Next, using supervised methods such as named entity recognition methods, along with the application of knowledge bases (e.g., Wikipedia) to the candidate phrases, keyphrases are selected from the candidate phrases.

Embodiments also allow for keyphrase extraction in the absence of a long description for a collection. Whereas in existing approaches to keyphrase extraction, the absence of long descriptions is a challenge as it is more difficult to derive suitable keyphrases from short descriptions, embodiments facilitate the use of short descriptions, title, database title, database category description, start year, end year, and/or facets, combinations and/or alterations thereof, and other suitable sources to determine keyphrases. This advantageously facilitates the use of text collections that lack long descriptions, a common occurrence in genealogical content and research.

Embodiments of the present disclosure have several advantages over conventional techniques. One advantage of embodiments described herein is due to being an ensemble method that uses the benefits of both supervised and unsupervised machine-learning methods. The candidate phrase identification step can utilize unsupervised machine-learning models while the keyphrase selection step can utilize supervised machine-learning models having been trained on domain-specific training data (e.g., genealogy data and/or human-labeled data). Compared to conventional approaches, embodiments described herein have superior performance for the task of keyphrase extraction in the field of genealogy as well as other fields in which domain-specific training data can be used. While genealogy-specific embodiments have been described, it will be appreciated that any suitable context, application, or modification is contemplated.

Some embodiments of the present disclosure include a data preprocessing step, in which an input text can filtered, denoised, refined, or otherwise modified to prepare for subsequent steps. In some instances, the input text may be a collection having a long description that includes multiple paragraphs. The long description might contain relevant and/or irrelevant information. In order to decrease noise for the task of candidate phrase identification as well as other tasks, it may be desirable to keep only the relevant information. In some instances, a collection input text might also have a short description that describes the most important information in the collection.

In some instances, the short description may be expanded in the long description. To keep only the relevant information, in some embodiments, a Universal Sentence Encoder may be used to calculate the semantic similarity of the short description with each paragraph in the long description. The Universal Sentence Encoder may return an embedding vector for the short description and for each paragraph of the long description and/or other component of a collection or text, and the similarity between the short description and each paragraph may be calculated using an inner product of the embedding vectors. The paragraphs with the highest similarity (or greater than a predetermined or other threshold) are considered to be the most relevant and may be retrieved and retained as the main collection description.

Some embodiments of the present disclosure include a keyphrase identification step, which may also be referred to as a candidate phrase identification step. In some embodiments, unsupervised, graph-based automatic keyword extraction models may be used to extract the most important words or terms from the input text. Models that may be used include YAKE (Yet Another Keyphrase Extraction method), Topical PageRank (TPR), TextRank, FirstPhrase, TF-IDF, and StupidKE. Each model may retrieve a ranked list of phrases and their scores. In other words, in embodiments, each model or any one or combination thereof may be utilized in sequence or in parallel.

Some embodiments of the present disclosure include a keyphrase selection step, in which one or more of the previously identified phrases are selected. This step may use an ad-hoc ranking algorithm that initially ranks phrases based on their inverse position within the respective ranked list of phrases. Then, the initial phrase ranking may be boosted if there are multiple occurrences of the phrase, indicating that multiple unsupervised solutions consider the phrase to be important. The ranking of a phrase is boosted if it is a named entity or it contains a named entity (e.g., using named entity recognition models such as SpaCy and Embeddings for Language Models (ELMo)).

In some instances, during the keyphrase selection step, a knowledge base such as Wikipedia can be applied to candidate phrases by increasing the scores of phrases that have an article on the knowledge base with a title similar to the phrase. For example, the rank of a phrase may be boosted if there are any links to Wikipedia articles with the same or similar phrase in its title. In some instances, the phrase ranking may be penalized for phrases that are shorter, so as to bias the results toward longer phrases. Additionally, phrases with a famous person, location, ethnicity, etc. can have increased scores. Phrases may be ranked in accordance with their scores, and the top N phrases may be selected as keyphrases for being the most descriptive of the textual data.

For the task of named entity recognition, supervised approaches that may be used include (1) SpaCy's pre-trained deep learning model (a convolutional neural network model) which may predict the named entities in the collection descriptions, and (2) ELMo, which may be trained on a manually annotated dataset that contains domain-specific user queries, such as actual queries from a genealogy search, modifications thereof, or any suitable modality. These models may be used to detect named entities from the candidate phrases.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

FIG. 1 illustrates an example functionality of a keyphrase extraction system 100, in accordance with some embodiments of the present disclosure. Keyphrase extraction system 100 may receive an input text 110 having a plurality of words 112 as input, and may extract a set of keyphrases 120 based on input text 110. Each of keyphrases 120 may include one or more consecutive words from words 112. In the illustrated example, keyphrase extraction system 100 extracts three different keyphrases from input text 110, which include "World War II," "attack on Pearl Harbor, Hawaii," and "President Roosevelt."

Figure 2:
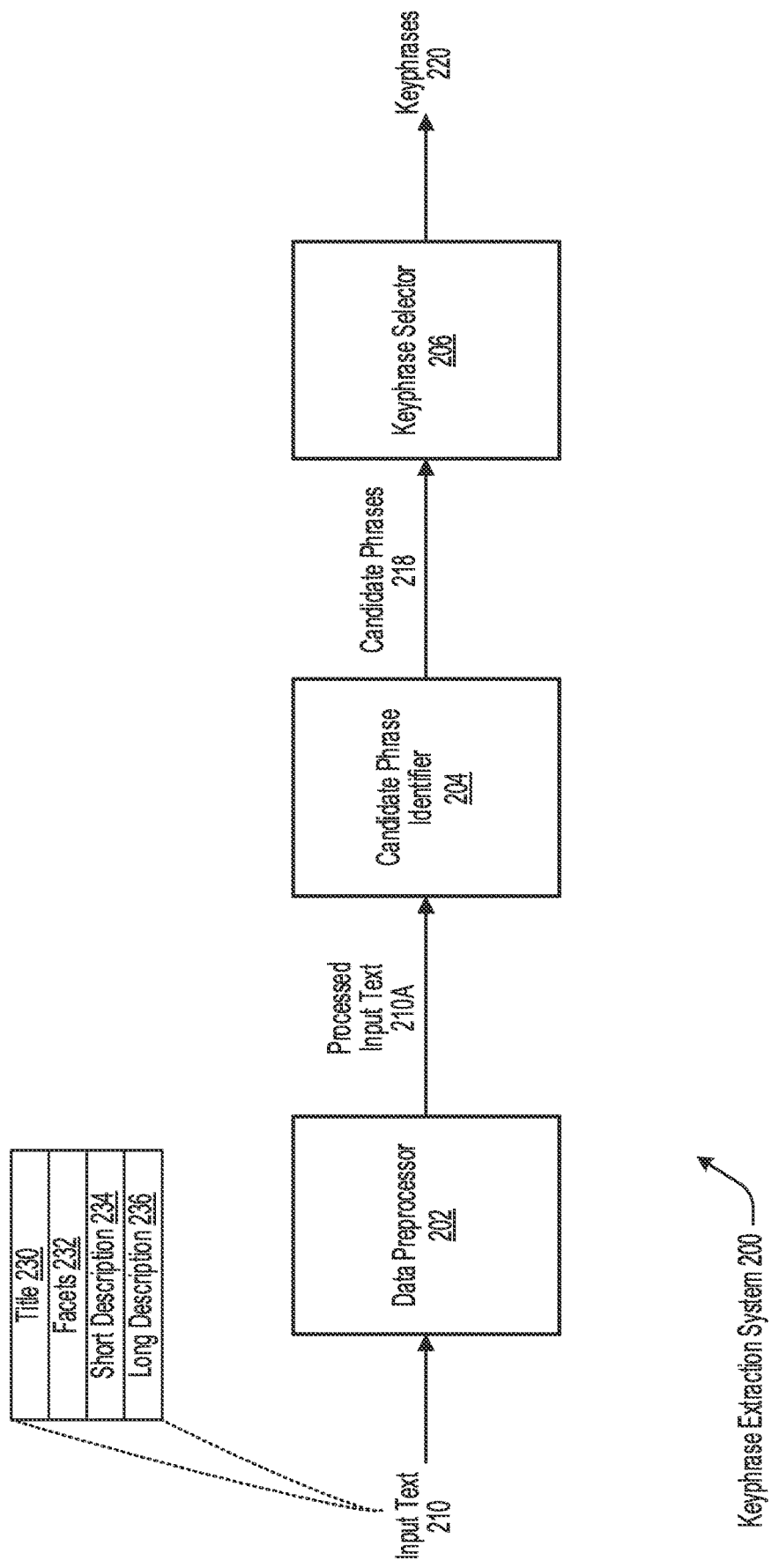
FIG. 2 illustrates an example of a keyphrase extraction system.

FIG. 2 illustrates an example of a keyphrase extraction system 200, in accordance with some embodiments of the present disclosure. Keyphrase extraction system 200 may be similar to keyphrase extraction system 100 described in FIG. 1. For example, keyphrase extraction system 200 may receive an input text 210 having a plurality of words. In some embodiments, the words of input text 210 may be divided between different sections of input text 210 including, for example, a title 230, a set of facets 232, a short description 234, and a long description 236. In some embodiments, input text 210 may have the form of a collection having one or more of title 230, facets 232, short description 234, and long description 236. For example, in the context of genealogy, input text 210 may have the form of a genealogy collection that may be retrievable by a user of a genealogy database. A genealogy collection having such a structure (e.g., having a title, facets, descriptions, etc.) may allow the genealogy data contained therein to be more accessible to a user who desires to research a particular historical person, place, or event.

In some embodiments, keyphrase extraction system 200 may include a data preprocessor 202, a candidate phrase identifier 204, and a keyphrase selector 206. In some embodiments, data preprocessor 202 may be optional such that input text 210 may be passed directly to candidate phrase identifier 204 without the preprocessing step. In some embodiments, data preprocessor 202 may receive input text 210 and generate a processed input text 210A, which may be a modified version of input text 210. For example, data preprocessor 202 may reduce the number of words in input text 210 by determining which words do not contribute to determining candidate phrases 218 and/or keyphrases 220 and removing those words. Data preprocessor 202 may remove entire sections (e.g., short description 234) or portions of individual sections (e.g., removing a single or multiple paragraphs from long description 236).

In some embodiments, candidate phrase identifier 204 may receive input text 210 (or processed input text 210A) and identify a set of candidate phrases 218 from the words of input text 210. Each of candidate phrases 218 may include one or more words, in embodiments consecutive words, from input text 210 (or processed input text 210A) that are determined to be good candidates for selecting keyphrases 220. Candidate phrase identifier 204 may correspond to or be configured to cooperate with an unsupervised learning component of keyphrase extraction system 200 in which one or more unsupervised machine-learning models are used to identify candidate phrases 218.

In some embodiments, keyphrase selector 206 may receive candidate phrases 218 from candidate phrase identifier 204 and select one or more phrases from candidate phrases 218 as keyphrases 220. Keyphrase selector 206 may correspond to or be configured to cooperate with a supervised learning component of keyphrase extraction system 200 in which one or more supervised machine-learning models are used to select keyphrases 220. Furthermore, keyphrase selector 206 may calculate scores for candidate phrases 218 and rank candidate phrases 218 based on their scores. The scores may be adjusted/modified based on the outputs of the supervised machine-learning model(s), a knowledge base module, and a duplicate detector, as will be described in FIG. 5.

Figure 3:
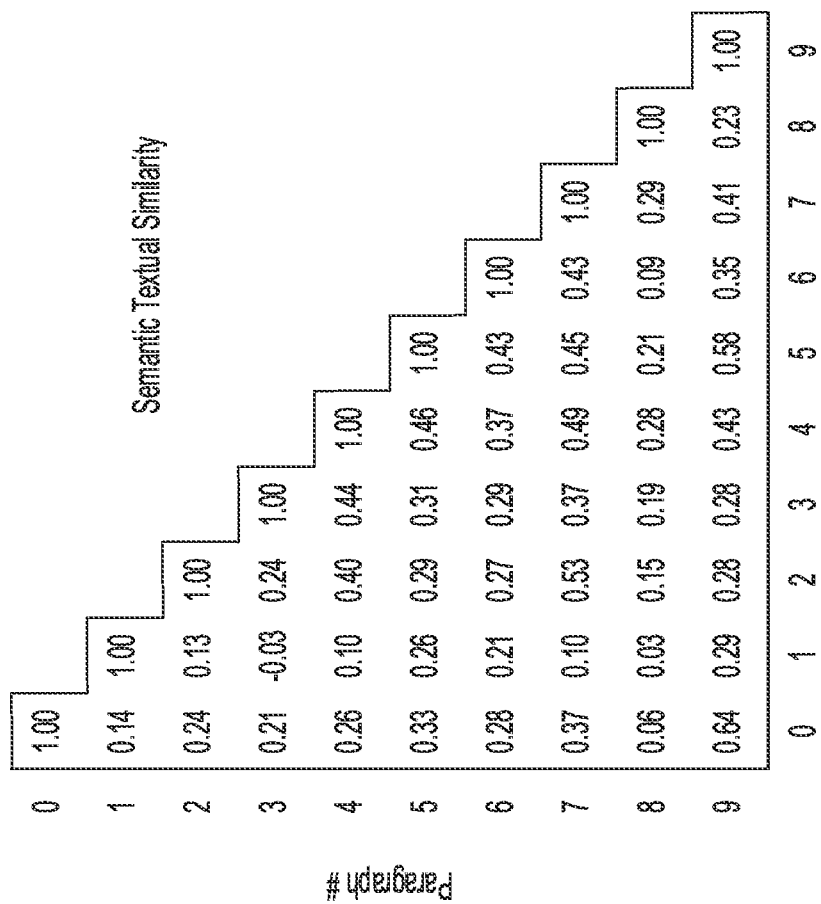
FIG. 3 illustrates an example of a set of similarity scores calculated by a data preprocessor.

FIG. 3 illustrates an example of a set of similarity scores calculated by a data preprocessor, such as data preprocessor 202 described in FIG. 2, in accordance with some embodiments of the present disclosure. Each of the similarity scores may be calculated between two paragraphs of an input text. In the illustrated example, the similarity between nine different paragraphs (e.g., Paragraphs 1-9) of an input text was calculated using a sentence encoder model (e.g., Universal Sentence Encoder). In some embodiments, certain paragraphs of the input text may be removed based on the similarity scores relative to a particular paragraph (e.g., relative to Paragraph 0, which may be a paragraph from the short description) or relative to multiple paragraphs (e.g., average similarity of Paragraph 0 relative to Paragraphs 1-9, average similarity of Paragraph 1 relative to Paragraphs 0 and 3-9, etc.). For example, paragraphs with lower similarity scores and/or lower average similarity scores may be removed while paragraphs with higher similarity scores and/or higher average similarity scores may be retained.

Figure 4:
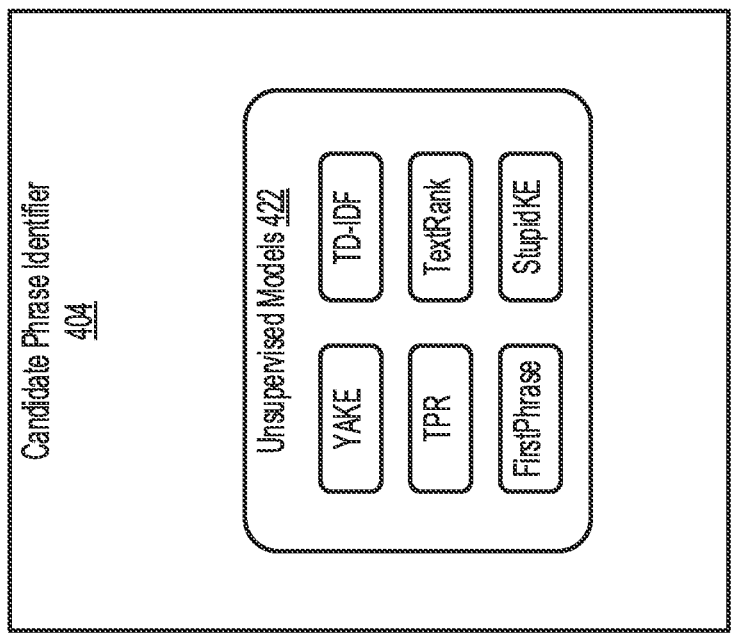
FIG. 4 illustrates an example of a candidate phrase identifier.

FIG. 4 illustrates an example of a candidate phrase identifier 404, in accordance with some embodiments of the present disclosure. Candidate phrase identifier 404 may be similar to candidate phrase identifier 204 described in FIG. 2. In some embodiments, candidate phrase identifier 404 may include one or more unsupervised models 422 for identifying candidate phrases from the input text. In the illustrated example, the one or more unsupervised models 422 include YAKE, TD-IDF, TPR, TextRank, FirstPhrase, and "Stupid Keyphrase Extraction," or "StupidKE." Each of unsupervised models 422 may receive the input text as input and may produce a set of candidate phrases in parallel or independently. Each set of candidate phrases may be unique or may include one or more phrases that are shared with another set of candidate phrases. The sets of candidate phrases may be combined in any suitable manner to produce the single set of candidate phrases that is outputted by candidate phrase identifier 404 to the keyphrase selector.

In some embodiments, one or more of unsupervised models 422 may be graph-based methods configured to, for example, build a graph based on input text such that nodes are words and edges represent a relation such as TF-IDF weight, co-occurrence, and/or position in text. The nodes may be ultimately ranked by their weight. For example, TextRank may be configured to build a graph with the words as nodes and edges representing co-occurrence relation, with the nodes ranked by their weight. TopicRank may be configured to build topics by creating HAC (average linkage), and then weighting the topics using random walk and selecting the first occurring candidate from important topics. Importance may be defined based on the PageRank algorithm. First Phrase or StupidKE may be configured to select sequences of nouns and adjectives and rank them according to inverse positions. YAKE may be configured to use statistical text features extracted from single documents to select words without linguistic tools or external resources.

Figure 5:
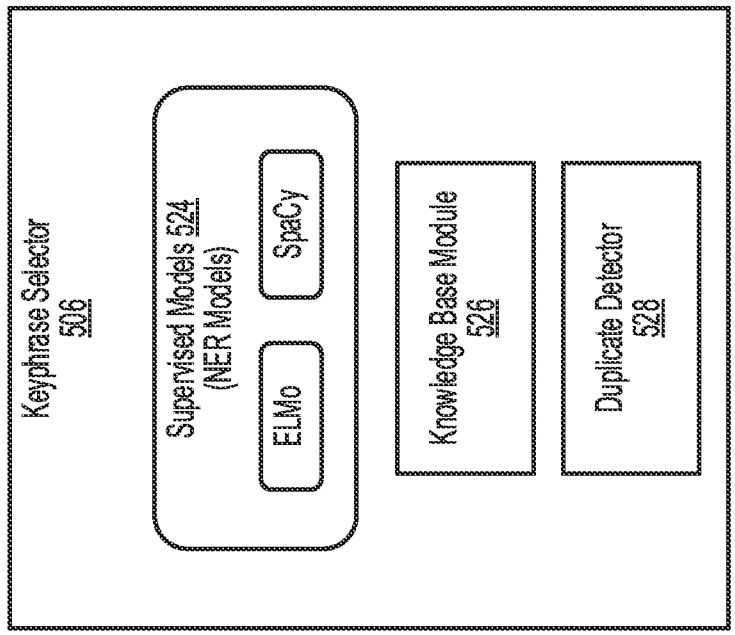
FIG. 5 illustrates an example of a keyphrase selector.

FIG. 5 illustrates an example of a keyphrase selector 506, in accordance with some embodiments of the present disclosure. Keyphrase selector 506 may be similar to keyphrase selector 206 described in FIG. 2. In some embodiments, keyphrase selector 506 may include one or more supervised models 524 for selecting phrases from the candidate phrases. In the illustrated example, supervised models 524 include ELMo and SpaCy, which are models for performing named entity recognition (NER). In some embodiments, SpaCy uses a CNN model pre-trained on an annotated text library such as OntoNotes 5.0, which includes telephone conversations, newswire, newsgroups, broadcast news, broadcast conversation, weblogs, religious texts, etc. annotated with structural information and shallow semantics. In some embodiments, ELMo provides deep contextualized word representations, such as GPE, EVENT, PERSON, DATE, etc. In yet further embodiments, ELMo provides and/or is configured to cooperate with a classifier trained on manually tagged queries. Such queries may be from a genealogical research service and may be tagged based on ethnicities, historical events, relationships, etc.

Each of supervised models 524 may receive the candidate phrases as input and may calculate scores (or score adjustments) for the candidate phrases. In some embodiments, supervised models 524 may determine whether each of the candidate phrases contain a named entity and may calculate higher scores for candidate phrases that are determined to contain named entities and lower scores for candidate phrases that are determined to not contain named entities.

In some embodiments, keyphrase selector 506 may include a knowledge base module 526 that may apply a knowledge base to each of the candidate phrases. In some embodiments, knowledge base module 526 may apply a knowledge base by determining whether the knowledge base includes an article having the same name or a similar name as a candidate phrase and calculating higher scores (or score adjustments) for those phrases. For example, knowledge base module 526 may utilize an Application Programming Interface ("API") for/from Wikipedia to determine whether there is a Wikipedia article having the same or similar name as a candidate phrase so as to appropriately adjust a score for a candidate phrase. In some embodiments, the API is the TAGME API that connects, on the fly, meaningful short phrases, known as "spots," to Wikipedia articles with the exact or a pertinent title to identify meaningful short phrases in a short text. Keyphraseness may be determined to be higher if there is an article with the exact term or a sufficiently similar term in Wikipedia. While Wikipedia has been described, it will be appreciated that the disclosure is not limited thereto and that any suitable knowledge base may be utilized.

In some embodiments, keyphrase selector 506 may include a duplicate detector 528 that determines whether each candidate phrase is a duplicate of another candidate phrase. Duplicate detector 528 may determine whether candidate phrases are exact duplicates, whether one candidate phrase contains another candidate phrase, or whether candidate phrases are similar to each other above a threshold. For candidate phrases that are exact duplicates, one candidate phrase may be removed and the other candidate score may have its score increased by some predetermined amount. For a candidate phrase that contains another candidate phrase, the larger candidate phrase may have its score increased and the smaller candidate phrase may have its score decreased (thereby favoring longer phrases).

Figure 6C:
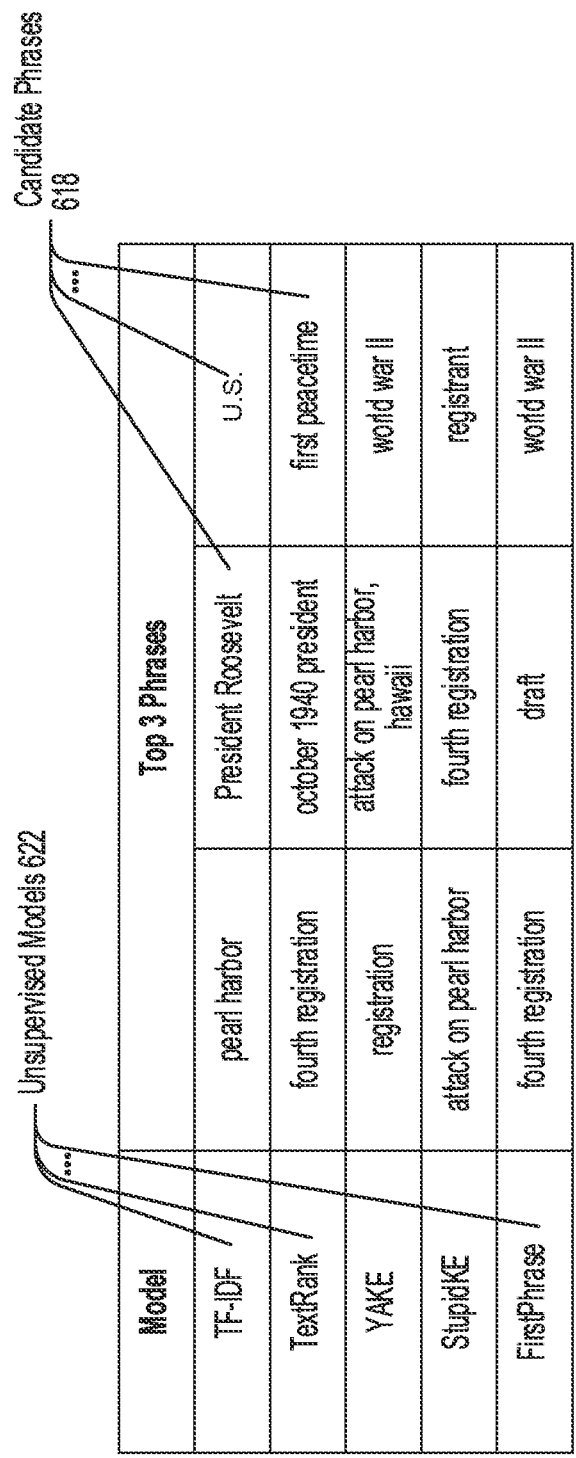

FIGS. 6A-6I illustrate an example of an extraction of a set of keyphrases 620 from an input text 610 using a keyphrase extraction system, in accordance with some embodiments of the present disclosure. FIG. 6A shows an input text 610 having a plurality of words 612. In the illustrated example, words 612 are divided between a title 630, a set of facets 632, a short description 634, and a long description 636. The example illustrated in FIGS. 6A-6I corresponds to a genealogical description found in a genealogy database.

FIG. 6B shows a data preprocessing step, performed by a data preprocessor, in which certain paragraphs and words 612 of input text 610 are removed to produce a processed input text 610A. In the illustrated example, each paragraph of long description 636 is compared to short description 634 to determine a similarity score, with higher similarity scores corresponding to higher levels of similarity. Based on the similarity score, it is determined whether each paragraph is selected or removed from input text 610. In the illustrated example, paragraphs with similarity scores less than 0.5 are removed while the only paragraph having a similarity score greater than 0.5 is selected and included in processed input text 610A. In some embodiments, paragraph similarity may be determined using a sentence encoder model. In addition, or alternatively, short text such as the title and/or facets may be pruned of irrelevant text. For example, in some embodiments TF-IDF can be used to prune irrelevant words from short text components of an input text such as "Golden Records," "Free Access," and other words in facets or otherwise that are not pertinent or informative of the topics of the collection.

FIG. 6C shows a candidate phrase identification step, performed by a candidate phrase identifier, in which processed input text 610A is provided to multiple unsupervised models 622 to determine a set of candidate phrases 618. In the illustrated example, processed input text 610A is provided to a TF-IDF model, which identifies three candidate phrases based on processed input text 610A including "pearl harbor", "President Roosevelt", and "US". Processed input text 610A is also provided to a TextRank model, which identifies three candidate phrases based on processed input text 610A including "fourth registration", "october 1940 president", and "first peacetime". This process continues with three additional models including a YAKE model, a StupidKE model, and a FirstPhrase model, each identifying three candidate phrases based on processed input text 610A. While a top-three embodiment is shown, it will be appreciated that any suitable number of top candidate phrases may be used. Further, while specific models are described, it will be appreciated that any suitable model, algorithm, variation thereof, combination of models and algorithms, or otherwise may be utilized as suitable.

In some embodiments, candidate phrases 618 that are identified during the candidate phrase identification step may be ranked by the corresponding unsupervised model. In the illustrated example, candidate phrases 618 in the leftmost column correspond to the highest-ranked candidate phrase identified by each unsupervised model and candidate phrases 618 in the right-most column correspond to the lowest-ranked candidate phrase (among the top three phrases). As such, in some embodiments, each unsupervised model may output a list of ranked candidate phrases. In some embodiments, different numbers of candidate phrases 618 may be identified by different unsupervised models 622. For example, one candidate phrase may identify a number of candidate phrases greater than three (e.g., four) and another candidate phrase may identify a number of candidate phrases less than three (e.g., two).

Figure 6D:

FIGS. 6D-6I show a keyphrase selection step, performed by a keyphrase selector, in which keyphrases 620 are selected from candidate phrases 618. In FIG. 6D, each of candidate phrases 618 is initialized with a score 640 based on the candidate phrase's ranking (using a calculation based on the phrase's inverse position), with the highest-ranked candidate phrases receiving a score of 0.5, the next highest-ranked candidate phrase receiving a score of 0.4306, and the next highest-ranked candidate phrase receiving a score of 0.375. The keyphrase selector may determine an initial ranking based on these initial scores, as shown in FIG. 6D.

In FIG. 6E, scores 640 are increased for candidate phrases 618 that are duplicates of other candidate phrases 618, as determined by a duplicate detector of the keyphrase selector. In the illustrated example, the score for the candidate phrase "fourth registration" is increased to 0.82 (from 0.5, 0.5, and 0.4306) and the three separate candidate phrases are combined into a single candidate phrase. Similarly, the score for the candidate phrase "world war II" is increased to 0.487 (from 0.375 and 0.375) and the two separate candidate phrases are combined into a single candidate phrase.

In FIG. 6F, scores 640 are increased for candidate phrases 618 that include named entities as determined using one or more supervised models 624. In the illustrated example, a SpaCY model is used to determine that each of the candidate phrases "pearl harbor", "President Roosevelt", "draft", "US", and "world war II" includes at least one named entity, and an ELMo model is used to determine that each of the candidate phrases "pearl harbor", "US", and "world war II" includes at least one named entity. The scores for these candidate phrases are then increased by some predetermined amount. In the illustrated example, the score for the candidate phrase "pearl harbor" is increased upon determining the presence of a named entity from 0.5 to 0.62, the score for the candidate phrase "President Roosevelt" is increased from 0.4306 to 0.49, the score for the candidate phrase "draft" is increased from 0.4306 to 0.49, the score for the candidate phrase "us" is increased from 0.375 to 0.495, and the score for the candidate phrase "world war II" is increased from 0.487 to 0.607.

In FIG. 6G, scores 640 are increased for candidate phrases 618 that match articles from knowledge bases, as determined by a knowledge base module of the keyphrase selector. In the illustrated example, it is determined that there exist corresponding Wikipedia articles that match the candidate phrases "pearl harbor", "attack on pearl harbor", "President Roosevelt", "attack on pearl harbor, hawaii", "draft", "US", and "world war II". The scores for these candidate phrases are then increased by some predetermined or other amount, e.g., from 0.62 to 0.69 in the case of "pearl harbor".

In FIG. 6H, scores 640 are decreased for candidate phrases 618 that are contained by other candidate phrases (i.e., are substrings of other candidate phrases), and scores 640 are increased for candidate phrases 618 that contain other candidate phrases. The determination that one candidate phrase contains or is contained by another candidate phrase may be made by the duplicate detector. In the illustrated example, it is determined that each of the candidate phrases "pearl harbor", "registration", and "attack on pearl harbor" is contained by at least one other candidate phrase. The scores for these candidate phrases are then decreased by some predetermined or other amount. Furthermore, it is determined that each of the candidate phrases "attack on pearl harbor, hawaii" and "fourth registration" contain at least one other candidate phrase and are not contained by any other candidate phrase. The scores for these candidate phrases are then increased by some predetermined amount.

In FIG. 6I, the keyphrase selector determines a final ranking based on the final scores. In the illustrated example, the top five candidate phrases are selected as keyphrases 620. In some embodiments, all candidate phrases having scores above some threshold (e.g., 0.5) may be selected as keyphrases 620. In some embodiments, the candidate phrases with the top N (e.g., five) scores may be selected as keyphrases 620.

Figure 7:
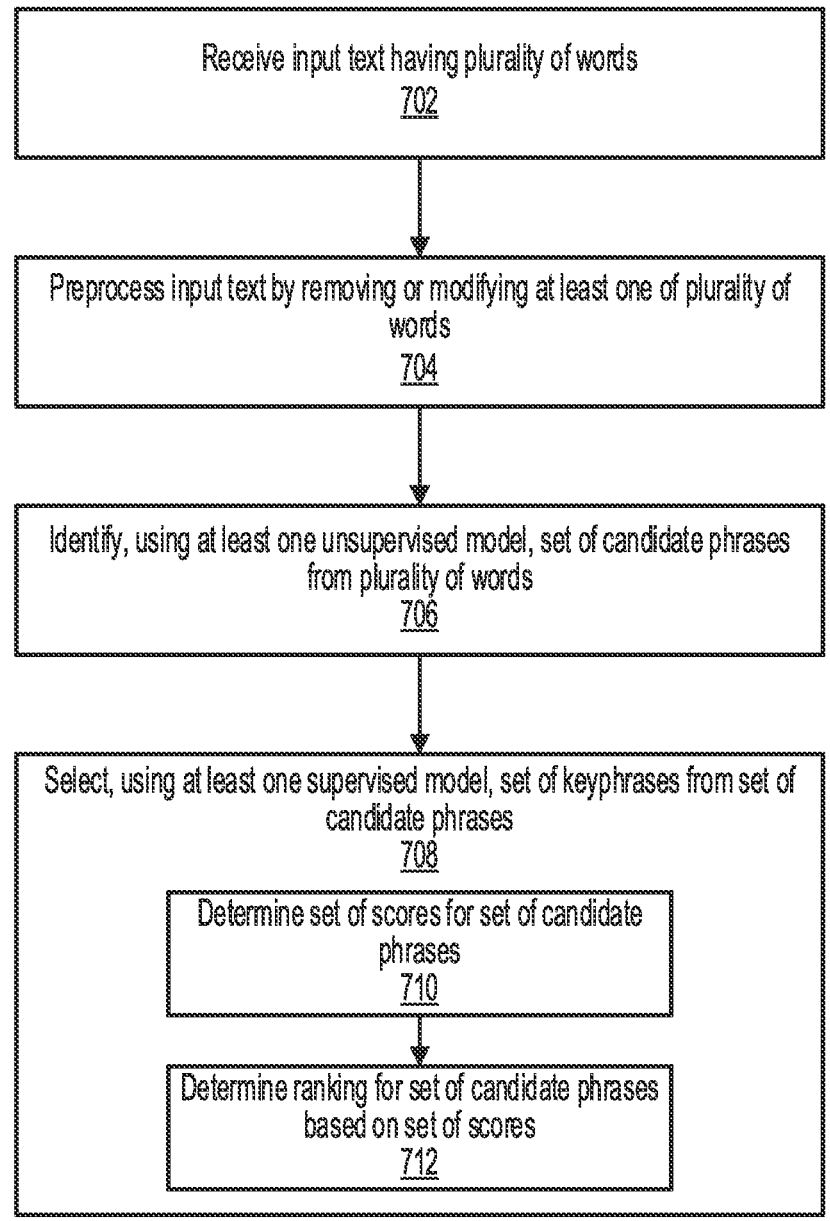
FIG. 7 illustrates an example of a method for extracting one or more keyphrases from an input text.

FIG. 7 illustrates an example method 700 for extracting one or more keyphrases from an input text, in accordance with some embodiments of the present disclosure. One or more steps of method 700 may be omitted during performance of method 700, and steps of method 700 may be performed in any order and/or in parallel. One or more steps of method 700 may be performed by one or more processors.

Method 700 may be implemented as a computer-readable medium or computer program product comprising instructions which, when the program is executed by one or more computers, cause the one or more computers to carry out the steps of method 700.

At step 702, an input text (e.g., input texts 110, 210, 610) having a plurality of words (e.g., words 112, 612) is received. The input text may include different sections, and the plurality of words may be divided between the sections. The sections may include a title (e.g., titles 230, 630), a set of facets (e.g., facets 232, 632), a short description (e.g., short descriptions 234, 634), and/or a long description (e.g., long descriptions 236, 636). The input text may be received by a keyphrase extraction system (e.g., keyphrase extraction systems 100, 200).

At step 704, the input text is preprocessed by removing or modifying at least one of the plurality of words. In some embodiments, one or more sections of the input text may be removed. In some embodiments, each of the paragraphs of the long description may be compared to the short description to determine a similarity score for each paragraph, and paragraphs having similarity scores below a threshold may be removed. The input text may be preprocessed by a data preprocessor (e.g., data preprocessor 202) of the keyphrase extraction system.

At step 706, a set of candidate phrases (e.g., candidate phrases 218, 618) are identified from the plurality of words. The set of candidate phrases may be identified using at least one unsupervised machine-learning model (e.g., unsupervised machine-learning models 422, 622). The at least one unsupervised machine-learning model may include one or more of: a YAKE model, a TD-IDF model, a TPR model, a TextRank model, a FirstPhrase model, or a StupidKE model. The set of candidate phrases may be identified by a candidate phrase identifier (e.g., candidate phrase identifier 204, 404) of the keyphrase extraction system.

In some embodiments, a first unsupervised machine-learning model may be used to identify a first set of candidate phrases from the plurality of words, a second unsupervised machine-learning model may be used to identify a second set of candidate phrases from the plurality of words, and a third unsupervised machine-learning model may be used to identify a third set of candidate phrases from the plurality of words. The first, second, and third sets of candidate phrases may be combined to form the set of candidate phrases. In some embodiments, each of the first, second, and third sets of candidate phrases may be ranked lists, with the ranking determined by the respective unsupervised machine-learning model.

At step 708, one or more keyphrases (e.g., keyphrases 120, 220, 620) are selected from the set of candidate phrases. The one or more keyphrases may be selected using at least one supervised machine-learning model (e.g., supervised machine-learning models 524, 624). The set of candidate phrases may be provided as input to the at least one supervised machine-learning model. The at least one supervised machine-learning model may have been previously trained using a set of training examples. The at least one supervised machine-learning model may include one or more of: an ELMo model or a SpaCy model. The one or more keyphrases may be selected by a keyphrase selector (e.g., keyphrase selectors 206, 506) of the keyphrase extraction system.

In some embodiments, step 708 may include one or both of steps 710 and 712. At step 710, a set of scores (e.g., scores 640) are determined for the set of candidate phrases. The set of scores may be at least partially determined using the at least one supervised machine-learning model. At step 712, a ranking for the set of candidate phrases may be determined based on the set of scores. In some embodiments, the one or more keyphrases may be selected from the set of candidate phrases based on the ranking.

In some embodiments, a first set of scores for the set of candidates may be determined based on the rankings determined by the at least one supervised machine-learning model in step 706. In some embodiments, a first set of score adjustments may be calculated by providing the set of candidate phrases to the at least one supervised machine-learning model as input. The first set of score adjustments may be added to the first set of scores to determine a second set of scores. In some embodiments, the one or more keyphrases may be selected based on the second set of scores. Alternatively, or additionally, a second set of score adjustments may be calculated using a knowledge base module (e.g., knowledge base module 526), and the second set of score adjustments may be added to the first set of scores to determine the second set of scores. Alternatively, or additionally, a third set of score adjustments may be calculated using a duplicate detector (e.g., duplicate detector 528), and the third set of score adjustments may be added to the first set of scores to determine the second set of scores.

In some embodiments, method 700 may further include the step of training the at least one supervised machine-learning model using the set of training examples. The set of training examples may be domain-specific training examples. For example, the set of training examples may be genealogy training examples. In some embodiments, each of the set of training examples may include a set of candidate phrases and a labelled set of keyphrases, which may be manually prepared. In some embodiments, method 700 may further include the steps of storing the one or more keyphrases in a genealogy database, storing the input text in the genealogy database, and associating the one or more keyphrases with the input text within the genealogy database.

Figure 8:
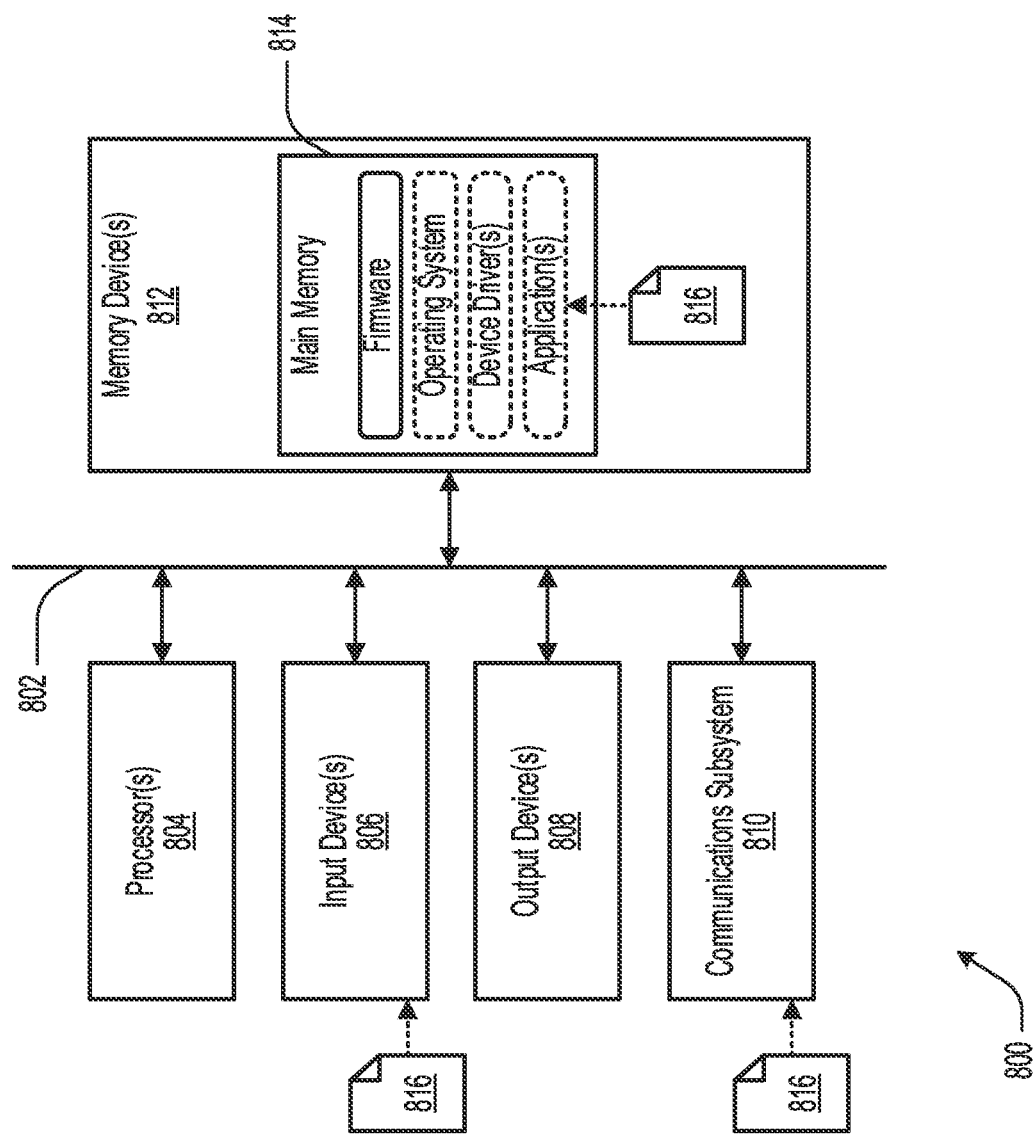
FIG. 8 illustrates an example computer system comprising various hardware elements.

FIG. 8 illustrates an example computer system 800 comprising various hardware elements, in accordance with some embodiments of the present disclosure. Computer system 800 may be incorporated into or integrated with devices described herein and/or may be configured to perform some or all of the steps of the methods provided by various embodiments. For example, in various embodiments, computer system 800 may be incorporated into keyphrase extraction systems 100 or 200 and/or may be configured to perform method 700. It should be noted that FIG. 8 is meant only to provide a generalized illustration of various components, any or all of which may be utilized as appropriate. FIG. 8, therefore, broadly illustrates how individual system elements may be implemented in a relatively separated or relatively more integrated manner.

In the illustrated example, computer system 800 includes a communication medium 802, one or more processor(s) 804, one or more input device(s) 806, one or more output device(s) 808, a communications subsystem 810, and one or more memory device(s) 812. Computer system 800 may be implemented using various hardware implementations and embedded system technologies. For example, one or more elements of computer system 800 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of computer system 800 may be communicatively coupled via communication medium 802. While communication medium 802 is illustrated as a single connection for purposes of clarity, it should be understood that communication medium 802 may include various numbers and types of communication media for transferring data between hardware elements. For example, communication medium 802 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, communication medium 802 may include one or more buses connecting pins of the hardware elements of computer system 800. For example, communication medium 802 may include a bus that connects processor(s) 804 with main memory 814, referred to as a system bus, and a bus that connects main memory 814 with input device(s) 806 or output device(s) 808, referred to as an expansion bus. The system bus may itself consist of several buses, including an address bus, a data bus, and a control bus. The address bus may carry a memory address from processor(s) 804 to the address bus circuitry associated with main memory 814 in order for the data bus to access and carry the data contained at the memory address back to processor(s) 804. The control bus may carry commands from processor(s) 804 and return status signals from main memory 814. Each bus may include multiple wires for carrying multiple bits of information and each bus may support serial or parallel transmission of data.

Processor(s) 804 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. Processor(s) 804 may include one or more multi-core processors, in which each core may read and execute program instructions concurrently with the other cores, increasing speed for programs that support multithreading.

Input device(s) 806 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. Input device(s) 806 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

Output device(s) 808 may include one or more of various devices that convert information into human-readable form, such as without limitation a display device, a speaker, a printer, a haptic or tactile device, and/or the like. Output device(s) 808 may also include devices for writing to removable storage devices or other removable media, such as those described in reference to input device(s) 806. Output device(s) 808 may also include various actuators for causing physical movement of one or more components. Such actuators may be hydraulic, pneumatic, electric, and may be controlled using control signals generated by computer system 800.

Communications subsystem 810 may include hardware components for connecting computer system 800 to systems or devices that are located external to computer system 800, such as over a computer network. In various embodiments, communications subsystem 810 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), among other possibilities.

Memory device(s) 812 may include the various data storage devices of computer system 800. For example, memory device(s) 812 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While processor(s) 804 and memory device(s) 812 are illustrated as being separate elements, it should be understood that processor(s) 804 may include varying levels of on-processor memory, such as processor registers and caches that may be utilized by a single processor or shared between multiple processors.

Memory device(s) 812 may include main memory 814, which may be directly accessible by processor(s) 804 via the memory bus of communication medium 802. For example, processor(s) 804 may continuously read and execute instructions stored in main memory 814. As such, various software elements may be loaded into main memory 814 to be read and executed by processor(s) 804 as illustrated in FIG. 8. Typically, main memory 814 is volatile memory, which loses all data when power is turned off and accordingly needs power to preserve stored data. Main memory 814 may further include a small portion of non-volatile memory containing software (e.g., firmware, such as BIOS) that is used for reading other software stored in memory device(s) 812 into main memory 814. In some embodiments, the volatile memory of main memory 814 is implemented as RAM, such as dynamic random-access memory (DRAM), and the non-volatile memory of main memory 814 is implemented as read-only memory (ROM), such as flash memory, erasable programmable read-only memory (EPROM), or electrically erasable programmable read-only memory (EEPROM).

Computer system 800 may include software elements, shown as being currently located within main memory 814, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 816, which are executable by computer system 800. In one example, such instructions 816 may be received by computer system 800 using communications subsystem 810 (e.g., via a wireless or wired signal that carries instructions 816), carried by communication medium 802 to memory device(s) 812, stored within memory device(s) 812, read into main memory 814, and executed by processor(s) 804 to perform one or more steps of the described methods. In another example, instructions 816 may be received by computer system 800 using input device(s) 806 (e.g., via a reader for removable media), carried by communication medium 802 to memory device(s) 812, stored within memory device(s) 812, read into main memory 814, and executed by processor(s) 804 to perform one or more steps of the described methods.

In some embodiments of the present disclosure, instructions 816 are stored on a computer-readable storage medium (or simply computer-readable medium). Such a computer-readable medium may be non-transitory and may therefore be referred to as a non-transitory computer-readable medium. In some cases, the non-transitory computer-readable medium may be incorporated within computer system 800. For example, the non-transitory computer-readable medium may be one of memory device(s) 812 (as shown in FIG. 8). In some cases, the non-transitory computer-readable medium may be separate from computer system 800. In one example, the non-transitory computer-readable medium may be a removable medium provided to input device(s) 806 (as shown in FIG. 8), such as those described in reference to input device(s) 806, with instructions 816 being read into computer system 800 by input device(s) 806. In another example, the non-transitory computer-readable medium may be a component of a remote electronic device, such as a mobile phone, that may wirelessly transmit a data signal that carries instructions 816 to computer system 800 and that is received by communications subsystem 810 (as shown in FIG. 8).

Instructions 816 may take any suitable form to be read and/or executed by computer system 800. For example, instructions 816 may be source code (written in a human-readable programming language such as Java, C, C++, C#, Python), object code, assembly language, machine code, microcode, executable code, and/or the like. In one example, instructions 816 are provided to computer system 800 in the form of source code, and a compiler is used to translate instructions 816 from source code to machine code, which may then be read into main memory 814 for execution by processor(s) 804. As another example, instructions 816 are provided to computer system 800 in the form of an executable file with machine code that may immediately be read into main memory 814 for execution by processor(s) 804. In various examples, instructions 816 may be provided to computer system 800 in encrypted or unencrypted form, compressed or uncompressed form, as an installation package or an initialization for a broader software deployment, among other possibilities.

In one aspect of the present disclosure, a system (e.g., computer system 800) is provided to perform methods in accordance with various embodiments of the present disclosure. For example, some embodiments may include a system comprising one or more processors (e.g., processor(s) 804) that are communicatively coupled to a non-transitory computer-readable medium (e.g., memory device(s) 812 or main memory 814). The non-transitory computer-readable medium may have instructions (e.g., instructions 816) stored therein that, when executed by the one or more processors, cause the one or more processors to perform the methods described in the various embodiments.

In another aspect of the present disclosure, a computer-program product that includes instructions (e.g., instructions 816) is provided to perform methods in accordance with various embodiments of the present disclosure. The computer-program product may be tangibly embodied in a non-transitory computer-readable medium (e.g., memory device(s) 812 or main memory 814). The instructions may be configured to cause one or more processors (e.g., processor(s) 804) to perform the methods described in the various embodiments.

In another aspect of the present disclosure, a non-transitory computer-readable medium (e.g., memory device(s) 812 or main memory 814) is provided. The non-transitory computer-readable medium may have instructions (e.g., instructions 816) stored therein that, when executed by one or more processors (e.g., processor(s) 804), cause the one or more processors to perform the methods described in the various embodiments.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes reference to one or more of such users, and reference to "a processor" includes reference to one or more processors and equivalents thereof known to those skilled in the art, and so forth.

Also, the words "comprise," "comprising," "contains," "containing," "include," "including," and "includes," when used in this specification and in the following claims, are intended to specify the presence of stated features, integers, components, or steps, but they do not preclude the presence or addition of one or more other features, integers, components, steps, acts, or groups.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. A computer-implemented method for extracting keyphrases from input text, comprising:
   receiving a genealogical-input text having a plurality of words;
   generating a relevant genealogical-input text from the genealogical-input text by:
      determining, using a sentence encoder model, that a subset of words from the plurality of words in the genealogical-input text comprises information irrelevant to determining a candidate phrase; and
      modifying the genealogical-input text by removing the subset of words;
   identifying, using a plurality of unsupervised machine-learning models of a hybrid-ensemble system comprising the plurality of unsupervised machine-learning models and a plurality of supervised machine-learning models, a set of candidate phrases from the relevant genealogical-input text, wherein:
      each candidate phrase is associated with a score; and
      the plurality of unsupervised machine-learning models comprises a graph-based method configured to generate a digital-genealogical graph based on the relevant genealogical-input text, the digital-genealogical graph comprising nodes corresponding to words and edges representing at least one of a co-occurrence relation, a TF-IDF-weight relation, or a position-in-the-text relation;
   identifying, using the plurality of supervised machine-learning models of the hybrid-ensemble system, one or more named entities from the set of candidate phrases, wherein using the plurality of supervised machine-learning models comprises using:
      an embeddings-for-language-models (ELMo) model, trained on a manually annotated dataset comprising domain-specific user queries, to provide deep contextualized word representations; and
      a SpaCy model to predict, utilizing a convolutional neural network pre-trained on an annotated text library, the one or more named entities;
   determining, by the hybrid-ensemble system, an updated set of scores associated with the set of candidate phrases based on the one or more named entities identified using the plurality of supervised machine-learning models;
   identifying one or more duplicate candidate phrases in the set of candidate phrases;
   determining, from the updated set of scores, a second updated set of scores associated with the set of candidate phrases based on the identified one or more duplicate candidate phrases; and
   identifying a keyphrase from the set of candidate phrases based on the second updated set of scores.

2. The computer-implemented method of claim 1, wherein the graph-based method comprises utilizing a TextRank model to generate the nodes and the edges of the digital-genealogical graph.

3. The computer-implemented method of claim 1, wherein using the plurality of unsupervised machine-learning models of the hybrid-ensemble system further comprises using a TopicRank model, a First Phrase model, or a Stupid Keyphrase Extraction model.

4. The computer-implemented method of claim 1, wherein identifying the one or more duplicate candidate phrases comprises determining, utilizing a duplicate detector, whether:
   at least two candidate phrases of the set of candidate phrases are exact duplicates;
   a first candidate phrase of the set of candidate phrases is included within a second candidate phrase of the set of candidate phrases; or
   at least two candidate phrases of the set of candidate phrases are similar based on a threshold level of similarity.

5. The computer-implemented method of claim 1, further comprising:
   identifying one or more candidate phrases associated with a knowledge base; and
   determining a third updated set of scores associated with the set of candidate phrases, wherein the third updated set of scores comprises an adjusted score for each of the identified one or more candidate phrases associated with the knowledge base,
   wherein identifying the keyphrase from the set of candidate phrases is based on the third updated set of scores.

6. The computer-implemented method of claim 1, further comprising identifying a keyphrase from the updated set of scores based on a predetermined threshold.

7. The computer-implemented method of claim 1, wherein generating the relevant genealogical-input text comprises:
   identifying, within the genealogical-input text, a short description and a long description;
   determining, utilizing the sentence encoder model, similarity of the short description with a portion of the long description; and
   determining that the portion of the long description comprises the subset of words from the plurality of words comprising information irrelevant to determining a candidate phrase based on the portion of the long description failing to meet a threshold level of similarity to the short description.

8. A non-transitory computer-readable medium comprising instructions that, when executed by one or more processors of a computer system, cause the computer system to perform at least the following:
   receive a genealogical-input text having a plurality of words;
   generate a relevant genealogical-input text from the genealogical-input text by:
      determining, using a sentence encoder model, that a subset of words from the plurality of words in the genealogical-input text comprises information irrelevant to determining a candidate phrase; and
      modifying the genealogical-input text by removing the subset of words;
   identify, using a plurality of unsupervised machine-learning models of a hybrid-ensemble system comprising the plurality of unsupervised machine-learning models and a plurality of supervised machine-learning models, a set of candidate phrases from the relevant genealogical-input text, wherein:
      each candidate phrase is associated with a score; and
      the plurality of unsupervised machine-learning models comprises a graph-based method configured to generate a digital-genealogical graph based on the relevant genealogical-input text, the digital-genealogical graph comprising nodes corresponding to words and edges representing at least one of a co-occurrence relation, a TF-IDF-weight relation, or a position-in-the-text relation;

identify, using the plurality of supervised machine-learning models of the hybrid-ensemble system, one or more named entities from the set of candidate phrases, wherein using the plurality of supervised machine-learning models comprises using:

an embeddings-for-language-models (ELMo) model, trained on a manually annotated dataset comprising domain-specific user queries, to provide deep contextualized word representations; and a SpaCy model to predict, utilizing a convolutional neural network pre-trained on an annotated text library, the one or more named entities;

determine, by the hybrid-ensemble system, an updated set of scores associated with the set of candidate phrases based on the one or more named entities identified using the plurality of supervised machine-learning models;

identify one or more duplicate candidate phrases in the set of candidate phrases;

determine, from the updated set of scores, a second updated set of scores associated with the set of candidate phrases based on the identified one or more duplicate candidate phrases; and identify a keyphrase from the set of candidate phrases based on the second updated set of scores.

9. The non-transitory computer-readable medium of claim 8, wherein the instructions are further executable by the one or more processors to cause the computer system to use the graph-based method by utilizing a TextRank model to generate the nodes and the edges of the digital-genealogical graph.

10. The non-transitory computer-readable medium of claim 8, wherein the instructions are further executable by the one or more processors to cause the computer system to use the plurality of unsupervised machine-learning models of the hybrid-ensemble system by using a TopicRank model, a First Phrase model, or a Stupid Keyphrase Extraction model.

11. The non-transitory computer-readable medium of claim 8, wherein the instructions are further executable by the one or more processors to cause the computer system to identify the one or more duplicate candidate phrases by determining, utilizing a duplicate detector, whether:

at least two candidate phrases of the set of candidate phrases are exact duplicates;

a first candidate phrase of the set of candidate phrases is included within a second candidate phrase of the set of candidate phrases; or at least two candidate phrases of the set of candidate phrases are similar based on a threshold level of similarity.

12. The non-transitory computer-readable medium of claim 8, wherein the instructions are further executable by the one or more processors to cause the computer system to perform at least the following:

identify one or more candidate phrases associated with a knowledge base; and determine a third updated set of scores associated with the set of candidate phrases, wherein the third updated set of scores comprises an adjusted score for each of the identified one or more candidate phrases associated with the knowledge base, wherein identifying the keyphrase from the set of candidate phrases is based on the third updated set of scores.

13. The non-transitory computer-readable medium of claim 8, wherein the instructions are further executable by the one or more processors to cause the computer system to identify a keyphrase from the updated set of scores based on a predetermined threshold.

14. The non-transitory computer-readable medium of claim 8, wherein the instructions are further executable by the one or more processors to cause the computer system to generate the relevant genealogical-input text by:

identifying, within the genealogical-input text, a short description and a long description;

determining, utilizing the sentence encoder model, similarity of the short description with a portion of the long description; and determining that the portion of the long description comprises the subset of words from the plurality of words comprising information irrelevant to determining a candidate phrase based on the portion of the long description failing to meet a threshold level of similarity to the short description.

15. A computer system comprising, one or more processors; and a non-transitory computer-readable medium comprising instructions that, when executed by the one or more processors, cause the computer system to perform at least the following:

receive a genealogical-input text having a plurality of words;

generate a relevant genealogical-input text from the genealogical-input text by:

determining, using a sentence encoder model, that a subset of words from the plurality of words in the genealogical-input text comprises information irrelevant to determining a candidate phrase; and modifying the genealogical-input text by removing the subset of words;

identify, using a plurality of unsupervised machine-learning models of a hybrid-ensemble system comprising the plurality of unsupervised machine-learning models and a plurality of supervised machine-learning models, a set of candidate phrases from the relevant genealogical-input text, wherein:

each candidate phrase is associated with a score; and the plurality of unsupervised machine-learning models comprises a graph-based method configured to generate a digital-genealogical graph based on the relevant genealogical-input text, the digital-genealogical graph comprising nodes corresponding to words and edges representing at least one of a co-occurrence relation, a TF-IDF-weight relation, or a position-in-the-text relation;

identify, using the plurality of supervised machine-learning models of the hybrid-ensemble system, one or more named entities from the set of candidate phrases, wherein using the plurality of supervised machine-learning models comprises using:

an embeddings-for-language-models (ELMo) model, trained on a manually annotated dataset comprising domain-specific user queries, to provide deep contextualized word representations; and a SpaCy model to predict, utilizing a convolutional neural network pre-trained on an annotated text library, the one or more named entities;

determine, by the hybrid-ensemble system, an updated set of scores associated with the set of candidate phrases based on the one or more named entities identified using the plurality of supervised machine-learning models;

identify one or more duplicate candidate phrases in the set of candidate phrases;

determine, from the updated set of scores, a second updated set of scores associated with the set of candidate phrases based on the identified one or more duplicate candidate phrases; and identify a keyphrase from the set of candidate phrases based on the second updated set of scores.

16. The computer system of claim 15, wherein the instructions are further executable by the one or more processors to cause the computer system to use the graph-based method by utilizing a TextRank model to generate the nodes and the edges of the digital-genealogical graph.

17. The computer system of claim 15, wherein using the plurality of unsupervised machine-learning models of the hybrid-ensemble system by using a TopicRank model, a First Phrase model, or a Stupid Keyphrase Extraction model.

18. The computer system of claim 15, wherein identifying the one or more duplicate candidate phrases comprises determining, utilizing a duplicate detector, whether:

at least two candidate phrases of the set of candidate phrases are exact duplicates;

a first candidate phrase of the set of candidate phrases is included within a second candidate phrase of the set of candidate phrases; or at least two candidate phrases of the set of candidate phrases are similar based on a threshold level of similarity.

19. The computer system of claim 15, wherein the instructions are further executable by the one or more processors to cause the computer system to perform at least the following:

identify one or more candidate phrases associated with a knowledge base; and determine a third updated set of scores associated with the set of candidate phrases, wherein the third updated set of scores comprises an adjusted score for each of the identified one or more candidate phrases associated with the knowledge base, wherein identifying the keyphrase from the set of candidate phrases is based on the third updated set of scores.

20. The computer system of claim 15, wherein the instructions are further executable by the one or more processors to cause the computer system to generate the relevant genealogical-input text by:

identifying, within the genealogical-input text, a short description and a long description;

determining, utilizing the sentence encoder model, similarity of the short description with a portion of the long description; and determining that the portion of the long description comprises the subset of words from the plurality of words comprising information irrelevant to determining a candidate phrase based on the portion of the long description failing to meet a threshold level of similarity to the short description.

* * * * *